(12) United States Patent
Dhingra et al.

(10) Patent No.: US 8,140,888 B1
(45) Date of Patent: Mar. 20, 2012

(54) HIGH AVAILABILITY NETWORK PROCESSING SYSTEM

(75) Inventors: Anurag Dhingra, Fremont, CA (US); Sunil Mehta, Mountain View, CA (US); Dileep Narayanan Nair, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 2148 days.

(21) Appl. No.: 10/143,066

(22) Filed: May 10, 2002

(51) Int. Cl.
*G06F 11/00* (2006.01)
(52) U.S. Cl. .......................................... 714/4.1
(58) Field of Classification Search ................ 714/4, 11, 714/12, 13
See application file for complete search history.

(56) References Cited

U.S. PATENT DOCUMENTS

| | | | | |
|---|---|---|---|---|
| 5,129,080 A | * | 7/1992 | Smith | 714/4 |
| 5,473,599 A | * | 12/1995 | Li et al. | 370/219 |
| 5,513,314 A | * | 4/1996 | Kandasamy et al. | 714/6 |
| 5,845,061 A | * | 12/1998 | Miyamoto et al. | 714/4 |
| 5,948,108 A | * | 9/1999 | Lu et al. | 714/4 |
| 6,108,300 A | * | 8/2000 | Coile et al. | 370/217 |
| 6,247,141 B1 | * | 6/2001 | Holmberg | 714/2 |
| 2002/0010792 A1 | * | 1/2002 | Border et al. | 709/238 |
| 2002/0129146 A1 | * | 9/2002 | Aronoff et al. | 709/225 |
| 2002/0133746 A1 | * | 9/2002 | Chen et al. | 714/13 |
| 2003/0005350 A1 | * | 1/2003 | Koning et al. | 714/4 |
| 2003/0033412 A1 | * | 2/2003 | Sundaresan et al. | 709/227 |
| 2003/0079154 A1 | * | 4/2003 | Park et al. | 714/1 |
| 2004/0162836 A1 | * | 8/2004 | Aronoff et al. | 707/100 |

* cited by examiner

*Primary Examiner* — Nadeem Iqbal
(74) *Attorney, Agent, or Firm* — Stolowitz Ford Cowger LLP

(57) ABSTRACT

A host receives messages from a network processing device. Messages received from a primary port are processed and also forwarded to a standby host over a secondary port. Messages received by the standby host over the secondary port are processed in the same was as the messages received over the primary port. However, the standby host will not respond to the messages received over the secondary port.

36 Claims, 5 Drawing Sheets

HIGH AVAILABILITY NETWORK PROCESSING SYSTEM

BACKGROUND

A Resource Policy Management System (RPMS) is an integral piece of Internet Protocol (IP) networks that are used to deliver integrated voice, data and fax services. The RPMS is used in Internet Protocol (IP) networks to implement Internet Service Provider (ISP) policies. For example, RPMS may be used on an ISP server to control the number of customers that can be connected to the ISP server at the same time. A customer dials-in to a Network Access Server (NAS). Before establishing a connection between the customer and the ISP, the NAS first notifies the ISP of the new dial-in request.

The RPMS tracks the number of connections that are currently being serviced by the ISP server. If the number of connections currently being serviced by the ISP server has reached some predefined threshold, the RPMS responds back to the NAS declining the new connection request. If the number of connections currently being serviced by the ISP server is below the specified threshold, then the RPMS responds back to the NAS accepting the new connection request. The NAS then establishes a connection between the customer and the ISP server.

The RPMS currently consists of a single-server application. If that single-server fails, all the RPMS states maintained in that server are lost. The network access server cannot simply switch all the customer connections over to a standby ISP server, since the standby server has no knowledge of the current state of the down ISP server.

The present invention addresses this and other problems associated with the prior art.

SUMMARY OF THE INVENTION

A host receives messages from a network processing device. Messages received from a primary port are processed and also forwarded to a standby host over a secondary port. Messages received by the standby host over the secondary port are processed in the same way as the messages received over the primary port. However, the standby host will not respond to the messages received over the secondary port.

The foregoing and other objects, features and advantages of the invention will become more readily apparent from the following detailed description of a preferred embodiment of the invention which proceeds with reference to the accompanying drawings.

DETAILED DESCRIPTION

Figure 1:
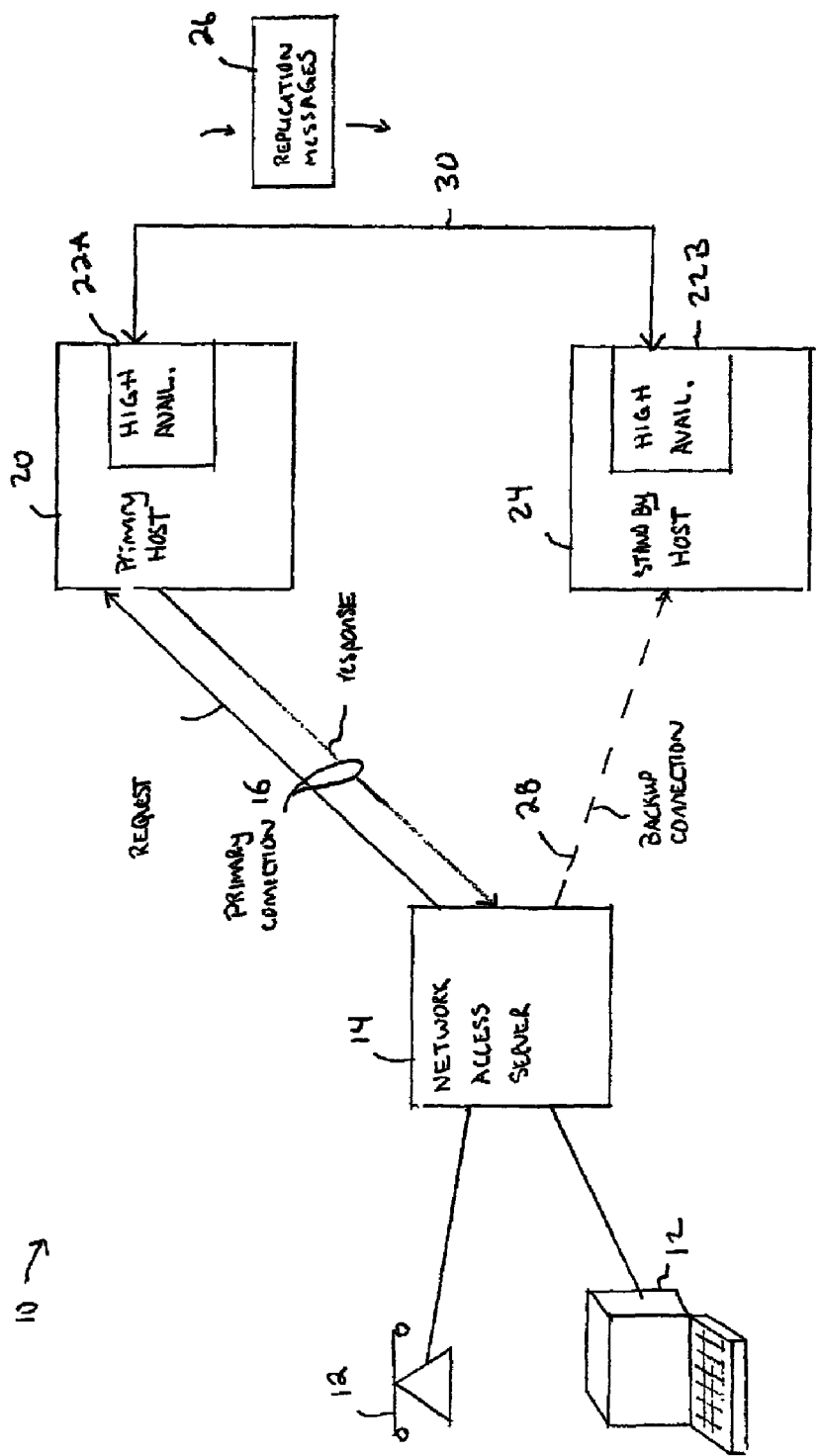
FIG. 1 is a diagram of a High Availability (HA) system.

FIG. 1 shows several endpoints 12 that connect to a primary host 20 though a Network Access Server (NAS) 14. The endpoints 12 make calls to numbers associated with particular hosts. In one example, the primary host 20 is a network server operated by an Internet Service Provider (ISP). The endpoints 12 can be any computer, IP phone, interface or network device that wants to communicate with host 20. The primary host 20 can be any network processing device that needs to maintain high availability.

Calls from the endpoints 12 are received by the NAS 14. Before, establishing a connection between the endpoint 12 and the primary host 20, a policy management protocol is conducted between NAS 14 and primary host 20. The policy management protocol tracks the current number of active connections on primary host 20.

If the number of connections currently being handled is above some specified threshold, the host 20 sends a response back to the NAS 14 refusing the connection request. However, if the number of connections currently being handled is below the threshold, the primary host 20 sends back a response over primary connection 16 accepting the request. The NAS 14 then establishes a connection between the endpoint 12 and the primary host 20.

An operating system in the NAS 14 allows configuration of a list of RPMS servers associated with different incoming calls. One RPMS server in the list is associated with primary host 20. If communication with primary host 20 fails, the operating system in NAS 14 looks for the next RPMS server identified on the list. In this case, standby host 24 is the next RPMS server in the list. In order to effectively take over the current connections and handle new connection requests for primary host 20, the standby host 24 needs to know the current state of primary host 20.

High Availability (HA) managers 22A and 22B are used to synchronize the state of standby host 24 with the state of primary host 20. The HA managers 22A and 22B create a connection 30 over any local area network, wide area network, wireless, or any other communication link. Any messages sent from NAS 14 to the policy manager in primary host 20 are forwarded by HA manager 22A as replication messages 26 over the secondary connection 30 to standby host 24.

Standby host 24 processes the connection requests in the same way they are processed by primary host 20. Except that the standby host 24 will not send responses back to the NAS 14. Whatever information needed to synchronize the two hosts is sent over link 30. Thus if active host 20 ever goes down, NAS 14 can then switch to standby host 24 and still operate under the same state previously provided by primary host 20. Examples of state information that are replicated in the standby host 24 can include the number of connections currently operating on the host and information regarding what connections have authority to access the host.

Figure 2:
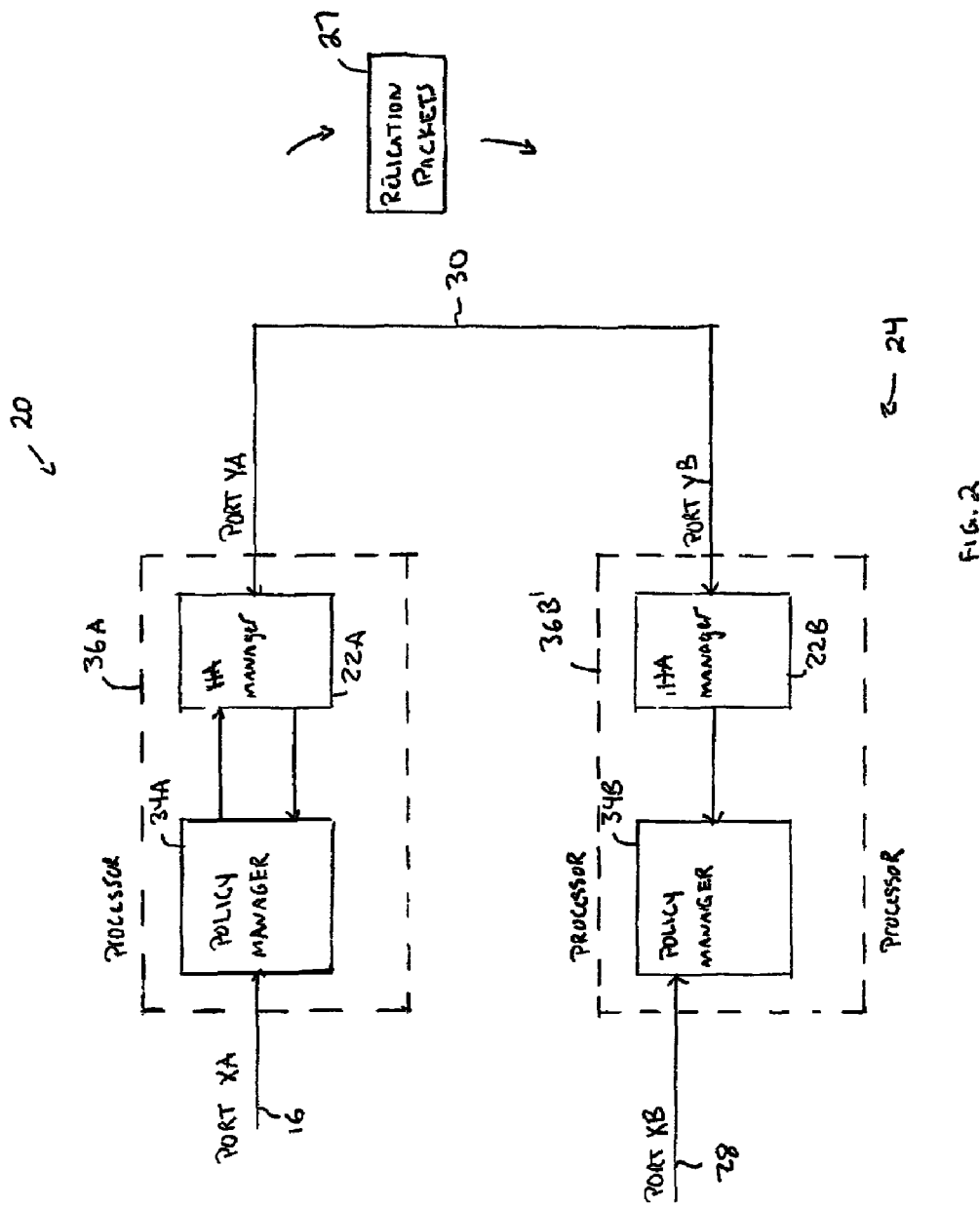
FIG. 2 is a detailed block diagram showing functional elements in the hosts shown in FIG. 1

FIG. 2 shows in more detail different functional elements in the two hosts 20 and 24. The primary host 20 includes a processor 36A and the standby host 24 includes a processor 36B. Processor 36A runs software that operates both a policy manager 34A and the HA manager 22A. Processor 36B runs software that operates both a policy manager 34B and the HA manager 22B. The policy managers 34A and 34B implement policies for handling connections between the NAS 14 (FIG. 1) and the hosts 20 and 24. The HA managers 22A and 22B synchronize states between the two policy managers 34A and 34B. This is done by creating and exchanging replication packets 27 that contain the same messages received by policy manager 34A over port XA.

All that is required for the policy managers 34A and 34B to become highly available is a software call to HA managers 22A and 22B, respectively. The software applications 34A and 34B on hosts 20 and 24, respectively, do not have to know about each other since synchronization is handled by the HA managers 22A and 22B. Further, the HA managers 22 do not have to understand how the software applications 34 operate. The HA system can be implemented with any application and is not limited to applications relating to connection message handling or RPMS.

The policy managers 34A and 34B and the HA managers 22A and 22B are typically implemented in software but could also be implemented using hardware logic circuitry or some combination of both hardware and software.

In one example, the policy managers 34A and 34B are a Resource Policy Management System (RPMS) and use a RADIUS protocol as described in the Internet Engineering Task Force (IETF) Request For Comment (RFC) 2865 and 2866. Of course other policy management systems can also be used. The RPMS and RADIUS protocols are known to those skilled in the art and are therefore not described in further detail.

In other implementations the HA managers may operate with applications other than policy managers. For example, the HA managers may be used in conjunction with document management applications, database applications, computer aided engineering applications, collaborative management systems, or any other application where different computer systems need to be synchronized.

The links 16 and 28 in one implementation use a User Datagram Protocol (UDP). In one implementation, the HA managers 22A and 22B establish a Transmission Control Protocol/Internet Protocol (TCP/IP) link 30. The TCP/IP link 30 prevents the HA managers 22 from having to exchange acknowledgements of message deliveries.

When HA manager 22A starts up, it tries to connect to a peer specified in its configuration file. In this case, the peer is HA manager 22B in standby host 24. If successfully connected, HA manager 22A downloads the current state of primary host 20 to HA manager 22B. This can be achieved by serializing (binary dump) the in-memory data on the primary host 20 and transmitting the in-memory data over connection 30. The HA manager 22B then de-serializes (re-constructs from binary) the data on the standby host 24.

Once up and running, all messages received by primary host 20 from other RPMS devices, such as network access server 14, are forwarded by HA manager 22A to standby host 24 using replication packets 27.

Figure 3:
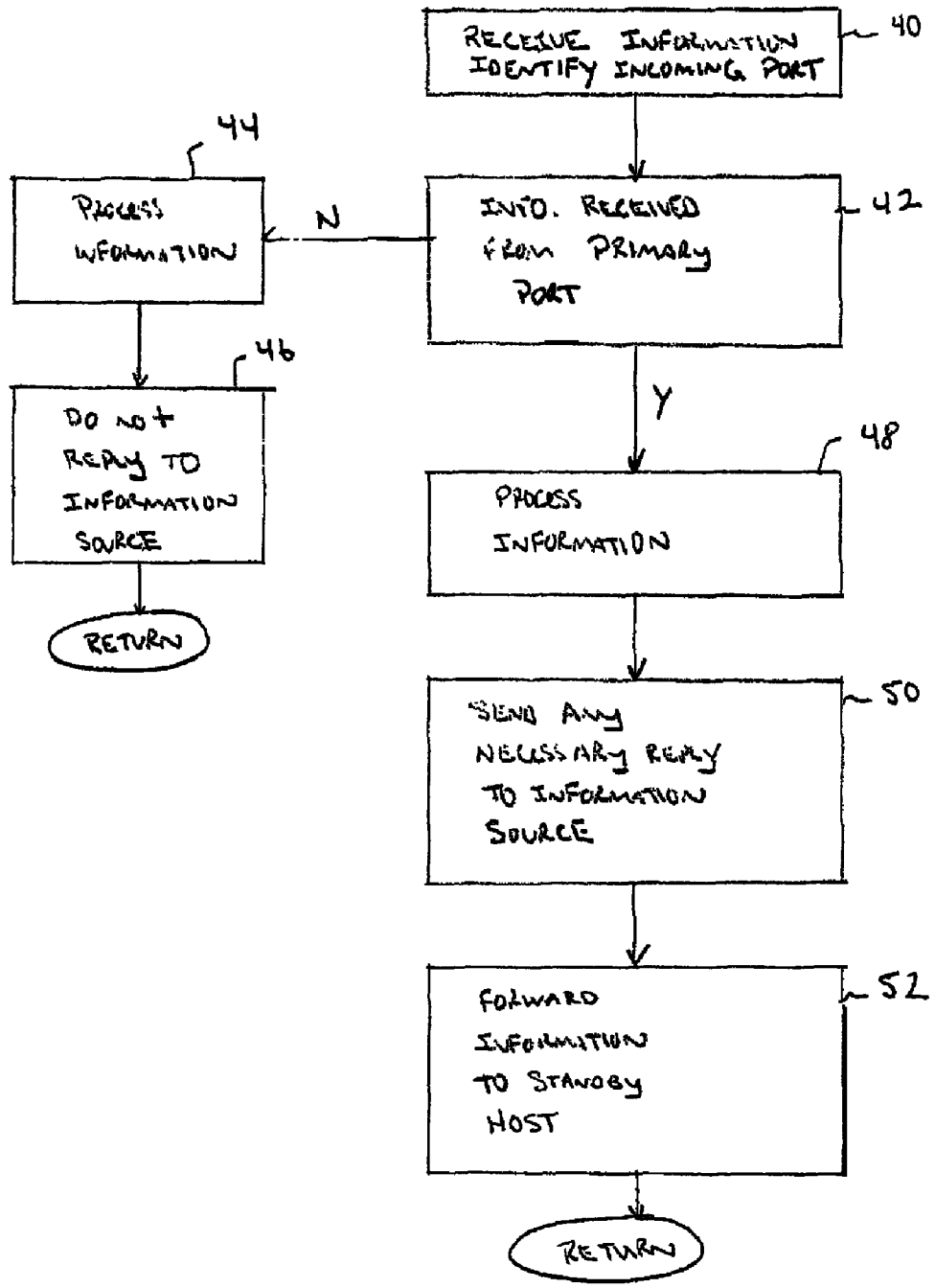
FIG. 3 is a flow diagram showing how information is processed in the hosts.

FIG. 3 describes in further detail how the policy managers 34A and 34B and the HA managers 22A and 22B operate. Information is received by the policy manager in block 40. The policy manager identifies the port associated with the information in block 40 of FIG. 3. One way the policy manager identifies the port is according to an HA manager call. When a software call is made to the HA manager, and the HA manager supplies information, the policy manager 34B knows that the information came from a secondary port.

For example, in FIG. 2, replication packets 27 arrive at the standby host 24 on the secondary port YB which is different from the primary port XB used for communicating directly with NAS 14. The policy manager 34B knows that any information received from HA manager 22B comes from secondary port YB and not the primary port XB.

If the information is received from the primary port in block 42, such as port XA or XB in FIG. 2 (e.g., not from the HA manager), the policy manager processes the information in a normal manner in block 48. The policy manager sends any necessary replies to the source associated with the information in block 50. For example, the policy manager may send back a reply to the NAS 14 (FIG. 1) that the information was received successfully or may send back a reply indicating a new connection request has been accepted. The HA manager for that policy manager in block 52 then automatically forwards the same information to its peer HA manager in the standby host.

Referring back to block 42, if the information is received over a secondary port, such as, port YA or YB in FIG. 2, the policy manager in that host processes the information in block 44 in the same way that it regularly processes messages received over the primary port. However, in block 46 no responses are sent back to the information source. This prevents the standby host from confusing the NAS 14.

Figure 4:
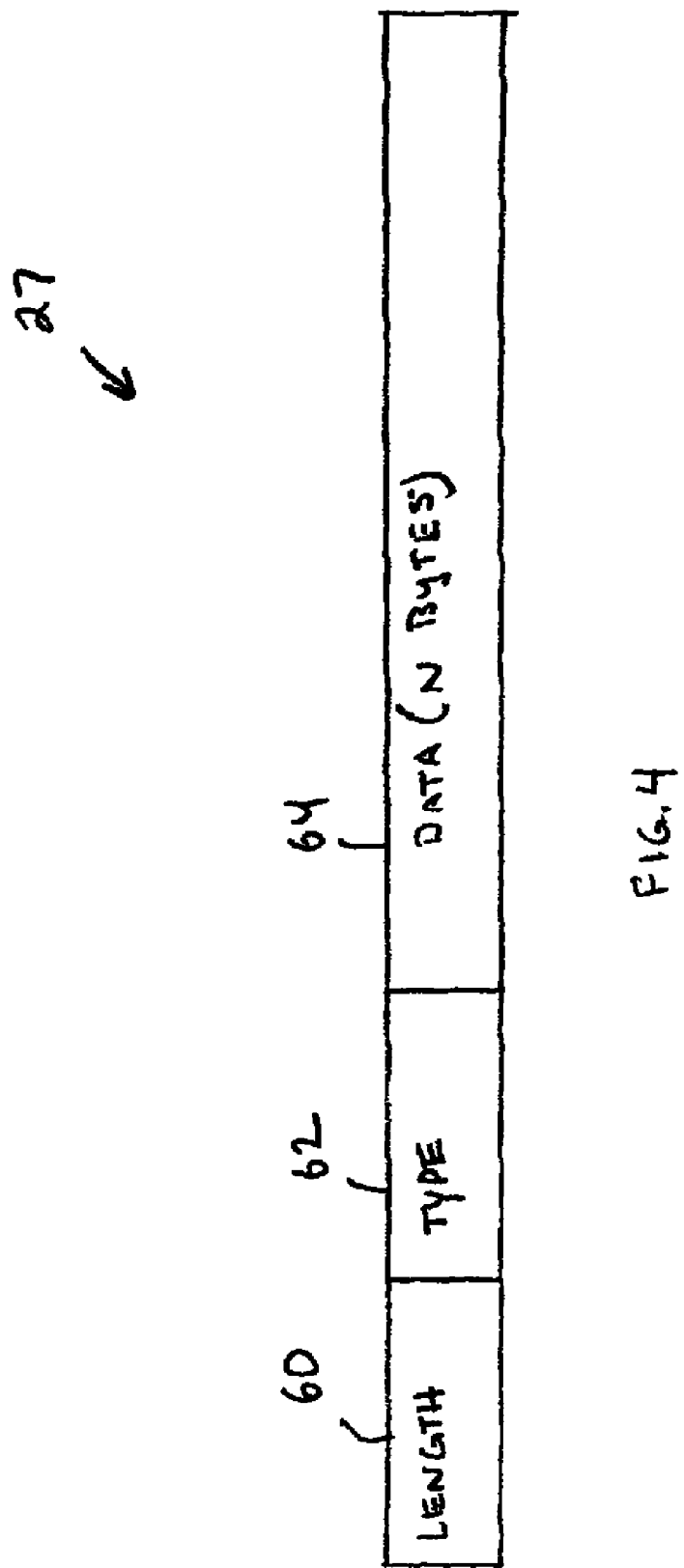
FIG. 4 is a diagram showing a replication packet format used by the HA system.

Referring to FIG. 4, the information forwarded over link 30 in FIG. 2 is formatted into replication packets 27 by the HA manager. The HA manager can forward any type of data that the policy managers 34A and 34B need to share. The replication packets include a length field 60 that identifies the length of the packet and a type field 62 that identifies the purpose of the packet. A data field 64 contains the information that was received by the primary host from the NAS 14 (FIG. 1). The type field aids the policy manager in determining what to do with the packet. In one example, the data field 64 contains the information that was initially received over port XA in primary host 20. In another embodiment, the replication packet 27 may contain the current state information of the primary host 20. The policy manager on secondary host 24 needs to do different processing for these two types of data. The type field in the packet helps it differentiate between the two pieces of data. The data field is optional and may be omitted for certain types of messages.

Figure 5:
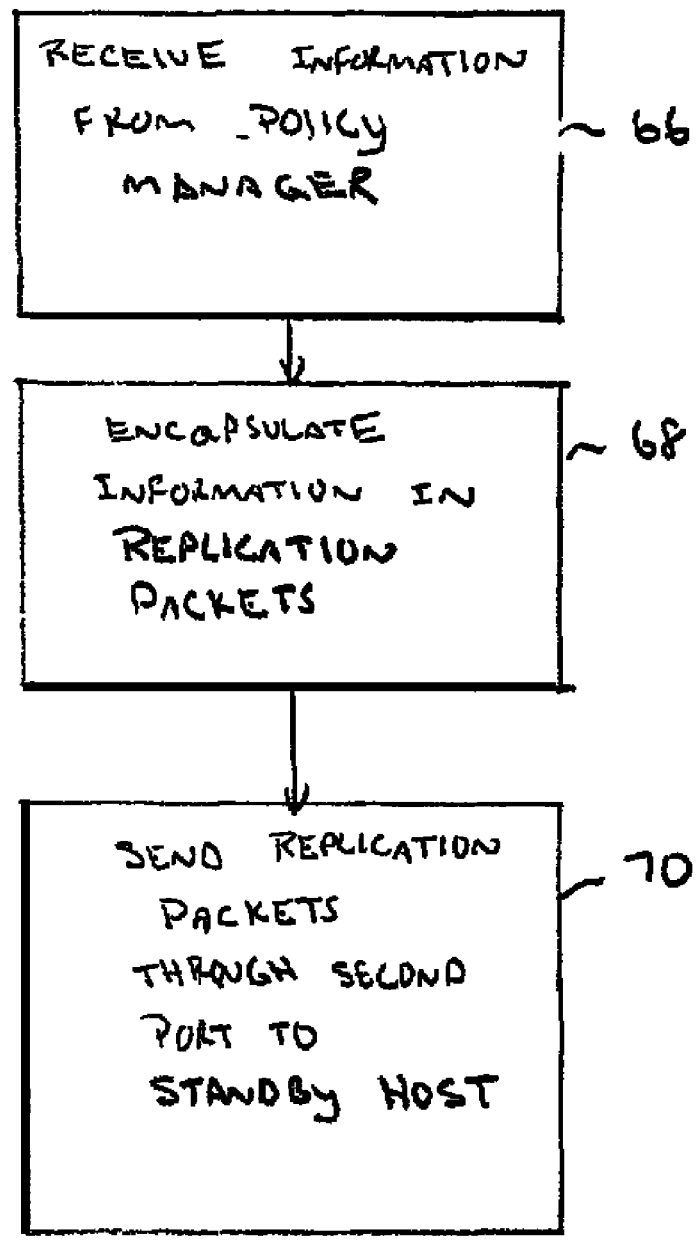
FIG. 5 is a flow diagram showing how information is encapsulated into replication packets.

FIG. 5 describes how the HA manager encapsulates information into replication packets. The HA manager in block 66 receives information from the policy manger. The HA manager in block 68 encapsulates the information in the format shown in FIG. 4. Alternatively, the HA manager converts the information into some format mutually recognizable by the peer HA managers. In block 70 the replication packets are sent through the secondary connection 30 to the standby host.

When the HA manager receives a replication packet 27 over connection 30, the HA manager reads the packet size field 60 and the type field 62. The HA manager then decapsulates the replication packets by removing the length field 60 and type field 62. The HA manager then forwards the data in field 64 to the policy manager. In one example, the HA manager receives a TCP/IP replication packet and then decapsulates the packet converting it back into UDP packets. The UDP packets are then processed in a normal manner by the policy manager 34.

The high availability system in one example is implemented as a plug-in that any application can use to become high availability enabled. In case of a component failure, the NAS 14 can switchover to the standby host 24 without service disruption. This solution is not dependent on proprietary network access servers to achieve high availability. So, the same policy manager software can also be used to manage network processing equipment made by different equipment manufacturers.

The HA managers 22 do not need to define any "management messages" for initiation and functioning. Thus, when two HA-enabled peers 22A and 22B startup, they don't have to do any application-level handshaking in order to start replicating calls. Similarly, no periodic messages need be exchanged to keep this call replication working.

Most HA systems are usually application specific. However, the HA system described above does not have to have any knowledge about the data being exchanged and does not need to interpret the data. This makes the HA system very generic and flexible. It is up to the applications using this HA system, such as policy manager, to define the syntax and semantics of the data that will be exchanged. This means that the same HA system can be used to HA-enable all kinds of servers. For example, Customer Profile Managers, Point of Presence Managers, etc, regardless of what the servers do and how the servers store data.

The HA system is extendible. It defines a very simple packet format that imposes almost no restriction on what can be exchanged between two servers. So, the HA system can be used for purposes other than high availability. For example, the HA system can be used for load balancing. In another application, the HA system can be used for synchronizing databases located on different servers. The HA system is a peer-to-peer mechanism. Thus, the overall system does not need to worry about "primary" or "secondary" servers, and having these servers take on unique characteristics.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A network processing device, comprising:
a processor and backup processor, each comprising a first port to connect to a network device and a second port to connect the processors to each other, wherein:
the processor is adapted to run an application that processes messages received from the network device via the first port of the processor and sends the messages to the backup processor via the second ports connecting the processors,
the backup processor is adapted to run a backup application that performs identical processing of the messages as the messages are received from the processor,
only the processor that receives the messages from the network device via the first port sends reply messages to the network, and
the backup processor automatically sends the reply messages if the messages are identified as being received on the first port of the backup processor.

2. The network processing device according to claim 1 wherein the application and the backup application are policy management applications that determine how connections are established on network processing devices.

3. The network processing device according to claim 2 wherein the policy management applications use a Resource Policy Management System protocol.

4. The network processing device according to claim 1 including a high availability manager operated by the processor that receives the messages from the application and outputs the messages over the second port.

5. The network processing device according to claim 4 wherein the high availability manager encapsulates the messages from the application into replication packets and sends the replication packets over the second port to the backup processor.

6. The network processing device according to claim 1 wherein the first ports use a first protocol that does not guarantee message delivery and the second ports use a second protocol that guarantees message delivery.

7. The network processing device according to claim 6 wherein the first protocol is a User Datagram Protocol (UDP) and the second protocol is a Transmission Control Protocol/Internet Protocol (TCP/IP).

8. A system, comprising:
a first host; and
a second host,
each of the first and second hosts having a primary port and a secondary port,
the primary ports connecting the first and second hosts to a network device, and
the secondary ports connecting the first host to the second host, where both the first and second hosts are separately configured to:
receive a request from the network device;
identify which port the request was received on;
process the request;
operate as a standby host if the request is identified as being received on the secondary port; and
reply immediately to the network device if the request is identified as being received on the primary port.

9. The system according to claim 8 wherein the primary port communicates with the network device using a User Datagram Protocol and the secondary ports send and receive the request using a Transmission Control Protocol.

10. The system according to claim 8 including:
a policy manager configured to manage policies for connections between the network device and the first and second hosts; and
a synchronization manager configured to synchronize the states of the first and second hosts wherein the synchronization manager encapsulates a connection information bit stream from the policy manager into replication packets and sends the replication packets to the second host.

11. The system according to claim 10 wherein the replication packets comprise primary host state information for synchronizing the policy manager of the second host with the policy manager of the first host.

12. The system according to claim 10 wherein the replication packets include a length field, a type field identifying a purpose of the packet, and a data field containing the connection information.

13. A method for synchronizing status for different hosts, comprising:
receiving messages from a network device in a primary host via a primary port;
processing the messages in the primary host;
forwarding the messages from the primary host via a secondary port to a standby host;
processing the messages in the standby host as the messages are received from the primary host, wherein the primary and standby hosts each comprise a primary port to connect to the network device and a secondary port to connect the primary and the standby hosts to each other;
identifying whether the messages are received at the primary port or the secondary port of the standby host; and sending reply messages to the network device from the standby host unless the messages are identified as being received at the secondary port of the standby host, without the standby host attempting to receive an acknowledgment of delivery of the messages by the primary host.

14. The method according to claim 13 wherein forwarding the messages comprises encapsulating the messages in replication packets and then forwarding the replication packets to the standby host.

15. The method according to claim 13 including establishing a primary connection between the network device and one of the primary or standby hosts using a User Datagram Protocol (UDP) via the primary ports and establishing a secondary connection between the primary host and the standby host using a Transmission Control Protocol/Internet Protocol (TCP/IP) via the secondary ports.

16. The method according to claim 15 including switching the primary connection to the standby host and using status information by the standby host over the secondary connection for handling the switched primary connection.

17. A system for synchronizing status for different hosts, comprising:
    means for receiving messages from a network device in a primary host via a primary port;
    means for processing the messages in the primary host;
    means for forwarding the messages from the primary host via a secondary port to a standby host;
    means for processing the messages in the standby host as the messages are received from the primary host, wherein the primary and standby hosts each comprise a primary port to connect to the network device and a secondary port to connect the primary and secondary hosts to each other;
    means for identifying whether the messages are received at the primary port or the secondary port of each of the hosts; and
    means for sending reply messages from the standby host to the network device if the messages are identified as being received at the primary port of the standby host, independent of any communication between the standby host and the primary host.

18. The system according to claim 17 wherein the means for forwarding the messages comprises means for encapsulating the messages in replication packets and then forwarding the replication packets to the standby host.

19. The system according to claim 17 including means for establishing a primary connection between the network device and one of the primary or standby hosts using a User Datagram Protocol (UDP) via the primary ports and establishing a secondary connection between the primary host and the standby host using a Transmission Control Protocol/Internet Protocol (TCP/IP) via the secondary ports.

20. The system according to claim 19 including means for switching the primary connection to the standby host and using status information by the standby host over the secondary connection for handling the switched primary connection.

21. A computer readable medium containing computer executable instructions executing on a computer for synchronizing status for different hosts, the computer readable medium comprising:
    code for receiving messages from a network device in a primary host via a primary port;
    code for processing the messages in the primary host;
    code for forwarding the messages from the primary host via a secondary port to a standby host;
    code for processing the messages in the standby host as the messages are received from the primary host, wherein the primary and the standby hosts each comprise a primary port to connect to the network device and a secondary port to connect the primary and secondary hosts to each other;
    code for identifying whether the messages are received at he primary port or the secondary port of each of the hosts; and
    code for automatically sending reply messages to the network device if the messages are identified as being received at the primary port of either the primary host and the standby host, without waiting for periodic updates between the hosts.

22. The computer readable medium according to claim 21 wherein the code for forwarding the messages from the primary host comprises code for encapsulating the messages in replication packets and code for forwarding the replication packets to the standby host.

23. The computer readable medium according to claim 21 including code for establishing a primary connection between the network device and one of the primary or standby hosts using a User Datagram Protocol (UDP) via the primary ports and establishing a secondary connection between the primary host and the standby host using a Transmission Control Protocol/Internet Protocol (TCP/IP) via the secondary ports.

24. The computer readable medium according to claim 23 including code for switching the primary connection to the standby host and using status information by the standby host over the secondary connection for handling the switched primary connection.

25. The system of claim 8 wherein the network device that sends message requests is adapted to configure a list of hosts to process message requests.

26. The system of claim 25 wherein the network device is adapted to identify a first available host on the list and send message requests to the first available host.

27. The method of claim 13, further comprising:
    configuring a list of hosts to process message requests.

28. The system of claim 17, further comprising:
    means configuring a list of hosts to process message requests.

29. The computer readable medium of claim 21, further comprising:
    code for configuring a list of hosts to process message requests.

30. The system of claim 26, wherein the network device is adapted to identify a next available host on the list and send message requests to the next available host when the first available host becomes unavailable.

31. The method of claim 27, further comprising:
    identifying a first available host on the list; and
    sending message requests to the first available host on the list.

32. The method of claim 31, further comprising:
    identifying a next available host on the list; and
    sending message requests to the next available host on the list when the first available host becomes unavailable.

33. The method of claim 28, further comprising:
    means for identifying a first available host on the list; and
    means for sending message requests to the first available host.

34. The method of claim 33, further comprising:
    means for identifying a next available host on the list; and
    means for sending message requests to the next available host on the list when the first available host becomes unavailable.

35. The computer readable medium of claim 29, further comprising:

code for identifying a first available host on the list; and code for sending message requests to the first available host on the list.

36. The computer readable medium of claim 29, further comprising:

code for identifying a next available host on the list; and code for sending message requests to the next available host on the list when the first available host becomes unavailable.

* * * * *